United States Patent [19]

Schilling

[11] Patent Number: 4,464,286

[45] Date of Patent: * Aug. 7, 1984

[54] CATIONIC BITUMINOUS EMULSIONS

[75] Inventor: Peter Schilling, Charleston, S.C.

[73] Assignee: Westvaco Corporation, New York, N.Y.

[*] Notice: The portion of the term of this patent subsequent to Aug. 7, 2001 has been disclaimed.

[21] Appl. No.: 371,720

[22] Filed: Apr. 26, 1982

[51] Int. Cl.$^3$ .................. B01J 13/00; C09D 3/24
[52] U.S. Cl. .................. 252/311.5; 106/277; 252/314; 252/356; 252/357
[58] Field of Search ............. 252/311.5; 106/277

[56] References Cited

U.S. PATENT DOCUMENTS

| | | | |
|---|---|---|---|
| 2,550,476 | 4/1951 | Hersberger | 106/277 X |
| 2,966,478 | 12/1960 | Harrison | 260/47 |
| 3,026,266 | 3/1962 | Mertens et al. | 252/311.5 |
| 3,096,292 | 7/1963 | Mertens | 252/311.5 |
| 3,097,174 | 7/1963 | Mertens | 252/311.5 |
| 3,220,953 | 11/1965 | Borgfeldt | 252/311.5 |
| 3,230,104 | 1/1966 | Falkenberg et al. | 106/277 |
| 3,324,041 | 6/1967 | Sommer et al. | 252/311.5 |
| 3,423,221 | 1/1969 | Borgfeldt | 252/311.5 X |
| 3,445,258 | 5/1969 | Ferm et al. | 106/277 |
| 3,466,247 | 9/1969 | Ohtsuka et al. | 252/311.5 |
| 3,518,101 | 6/1970 | Gzemski et al. | 106/277 |
| 3,728,278 | 4/1973 | Tramelli | 252/311.5 |
| 3,738,852 | 6/1973 | Doi et al. | 106/277 |
| 3,753,968 | 8/1973 | Ward | 260/97.6 |
| 3,764,359 | 10/1973 | Dybalski | 106/280 |
| 3,867,162 | 2/1975 | Elste, Jr. | 106/277 |
| 3,899,476 | 8/1975 | Ward | 260/97.5 |
| 3,957,524 | 5/1976 | Doughty et al. | 106/277 |
| 4,013,601 | 3/1977 | Alford | 260/18 |
| 4,017,419 | 4/1977 | Ludwig et al. | 252/311.5 |
| 4,081,462 | 3/1978 | Powers et al. | 260/501.1 |

FOREIGN PATENT DOCUMENTS 701860 1/1954 United Kingdom ............ 252/311.5

Primary Examiner—Richard D. Lovering
Attorney, Agent, or Firm—Terry B. McDaniel; Richard L. Schmalz

[57] ABSTRACT

Emulsifiers for solventless and solvent containing mixing grade, oil-in-water cationic bituminous emulsions are disclosed which are the reaction products of polyamines and the polycarboxylic acids of the general formulae

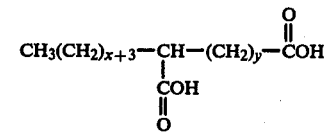

or

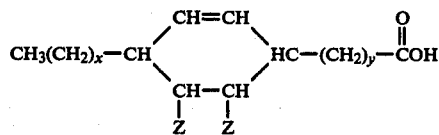

wherein x and y are integers from 3 to 9, x and y together equal 12, at least one Z is a carboxylic acid group and any remaining Z is hydrogen.

11 Claims, No Drawings

CATIONIC BITUMINOUS EMULSIONS

FIELD OF THE INVENTION

This invention relates to improved bituminous emulsions, specifically to cationic medium set mixing grade emulsions. More particularly, it relates to emulsifiers for solventless and solvent containing mixing grade, oil-in-water cationic bituminous emulsions, which emulsifiers are the reaction products of polyamines with certain polycarboxylic acids.

DESCRIPTION OF THE PRIOR ART

In paving operations, three main practices are employed to achieve thorough mixing of bitumen and aggregate:

(1) mixing of free flowing heated asphalt (asphalt cement) with pre-dried aggregate;

(2) mixing pre-dried aggregate with asphalt diluted with a hydrocarbon solvent (cutback asphalt, cutter stock) at ambient temperatures; and (3) mixing aggregate with asphalt emulsions, e.g., oil-in-water emulsions, obtained by vigorous agitation of asphalt and water in the presence of an emulsifying agent.

Because of increasing cost in energy and hydrocarbon solvents and because of environmental concerns, the use of emulsified asphalt is increasing. Dependent on the emulsifier used to achieve an emulsion, anionic or cationic emulsions are obtained. In anionic emulsions, asphalt droplets are negatively charged; in cationic emulsions, the asphalt droplets bear positive charges and migrate to the cathode when an electric field is applied. Experience in the field has shown that cationic emulsions are easier to apply and obviate many of the disadvantages of anionic emulsions, such as unpredictable break and poor bonding of asphalt to the aggregate surface resulting in stripping. Due to the electrostatic attraction of positively charged asphalt droplets and negatively charged aggregate surfaces, cationic bituminous emulsions deposit more rapidly, and stronger bonds between bitumen and aggregate are obtained.

Generally, depending on the characteristics of the type of mixing and rate of break, cationic aqueous bituminous emulsions are classified as rapid setting (CRS), medium setting (CMS) and slow setting (CSS). The rate of set is determined by the type and the amount of emulsifier and the pH value of the cationic soap solution. In the case of rapid setting emulsions, mainly used for repair work of old wearing courses, the emulsion is applied on the existing surface and aggregate is spread on top, and after compaction, the road can be opened to traffic shortly after the application of the new coat (chip seal, etc.). Medium setting emulsions are mixed with aggregate prior to being used in road construction, and slow set emulsions can be mixed with aggregate and stored for a longer period of time without breaking on the aggregate surface.

Cationic emulsions are obtained by employing a variety of nitrogen containing organic compounds, such as fatty amines, fatty diamines, fatty triamines, fatty amidoamines, fatty imidazolines, fatty mono- and di-quaternary ammonium salts, and reaction products of all these compounds with ethylene oxide. The fatty radical of these compounds can have a variety of chemical structures, and the building blocks for the preparation of these amines can be obtained from a variety of sources, such as petroleum refinates, animal fats, vegetable and fish oils, and tall oil. Amidoamines suitable as emulsifiers are disclosed in U.S. Pat. No. 3,230,104 to Falkenberg and in U.S. Pat. No. 3,097,174 to Mertens. Combinations of fatty monoamines and triamines are disclosed in U.S. Pat. No. 3,738,852 to Doi; fatty diamines are disclosed in U.S. Pat. No. 3,728,278 to Tramelli and U.S. Pat. No. 3,518,101 to Gzemski; fatty quaternary and diquaternary salts and modifications thereof are disclosed in U.S. Pat. No. 3,220,953 to Borgfelt, U.S. Pat. No. 3,867,162 to Elste, U.S. Pat. No. 3,764,359 to Dybalski, U.S. Pat. No. 3,957,524 to Doughty and U.S. Pat. No. 3,466,247 to Ohtsuka, and fatty imidazolines are taught in U.S. Pat. No. 3,445,258 to Ferm.

Generally, cationic emulsions prepared with fatty amines, fatty diamines, fatty amidoamines, etc., are unstable when mixed with a variety of siliceous or calcareous aggregates. Rapid breaking on the aggregate surface is observed with an increase in stiffening. At this point, the mix becomes unworkable. To overcome this problem, it is common practice to use cutback asphalt instead of asphalt cement for medium set mixing grade asphalt emulsions. Although cutback emulsions prepared with these emulsifiers also break when mixed with the aggregate, the solvent (a hydrocarbon oil, such as naphtha, kerosene, diesel oil, etc.) decreases the viscosity of the asphalt and increases the workability of the aggregate-asphalt mix. After placement of the mixes, the solvent evaporates and the final stiff aggregate-asphalt matrix is obtained. Because of the dramatically increased cost of solvents in recent years and because of the effort to reduce pollution, suitable emulsifiers are sought for cationic mixing grade emulsions without using solvent. The use of tallow quaternary ammonium salts and tallow diquaternary diammonium salts for making emulsions suitable for slurry seal, a solventless application, is described in U.S. Pat. No. 3,764,359 to Dybalski, and the use of a quaternary amine obtained by reacting epichlorohydrin, trimethylamine and nonylphenol for solventless mixes is disclosed in U.S. Pat. No. 3,957,524 to Doughty.

The general object of this invention is to provide versatile emulsifiers for solventless and solvent containing mixing grade, oil-in-water bituminous emulsions. Another object of this invention is to provide emulsifier formulations for mixing grade emulsions which give a variety of set times as expressed in percent initial washoff coating (the percent coat on the aggregate surface after one minute mixing and immediate immersion in water) and percent one hour washoff coating. A further object of this invention is to provide a series of new amidoamines, imidazolines and N-containing polymeric materials, prepared as the reaction product of polycarboxylic acids and polyamines, suitable as emulsifiers for cationic oil-in-water emulsions.

SUMMARY OF THE INVENTION

It has been found that in contrast to amidoamines and imidazolines which are obtained by condensation of fatty acids, having a chain-length of $C_{12}$–$C_{22}$, with polyethylene amines, such as diethylene triamine, which give cationic rapid set emulsions, reaction products of polyamines with certain di- and tricarboxylic acids give emulsions capable of producing cationic medium set mixing grade asphalt emulsions, as well as rapid set asphalt emulsions. Solventless asphalts as well as asphalts containing up to 15% by volume of a hydrocarbon oil can be used for emulsification.

DESCRIPTION OF THE PREFERRED EMBODIMENTS

The fatty acids used in the preparation of the invention cationic emulsifiers are of the following general formulae:

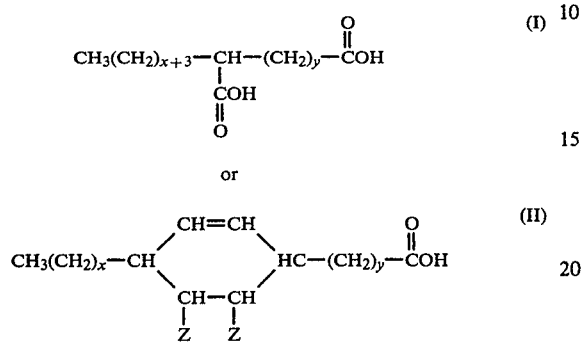

wherein x and y are integers from 3 to 9, x and y together equal 12, at least one Z is a carboxylic acid group and any remaining Z is hydrogen.

These acids are obtained by reaction of carbon monoxide and water with an unsaturated acid, preferably oleic acid, as described by Reppe and Kroper, in Ann 582, 63–65 (1953) in the case of formula I, and by Diels-Alder addition of acrylic, methacrylic, fumaric or maleic acid to polyunsaturated fatty acids with conjugated double bonds in the case of formula II, forming a cyclohexene structure. These acids are referred to as $C_{19}$-dicarboxylic acid, $C_{21}$-dicarboxylic acid and $C_{22}$-tricarboxylic acid. Acids of this type are disclosed in U.S. Pat. No. 3,753,968 and 3,899,476 to Ward and U.S. Pat. No. 4,081,462 to Powers et al.

When these acids are heated with a polyamine, a variety of reaction products can be obtained. As a general example, the reaction products of the $C_{21}$-dicarboxylic acid and diethylene triamine are described. By blending two moles of diethylene triamine with one mole of $C_{21}$-dicarboxylic acid, a bis-diethylene diammonium salt is formed, which upon heating to 230° C. forms the diamidoamine of the formula

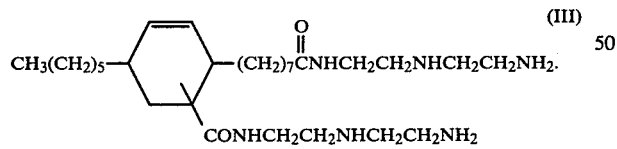

At the same time, in a competitive reaction, ring closure to an imidazoline structure is formed, which is a five membered ring containing two nitrogens, as shown in the following structure:

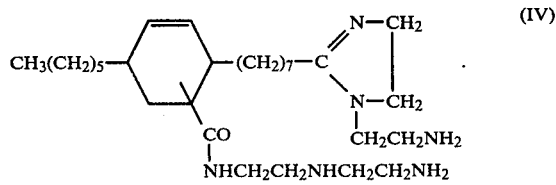

Further prolonged heating of (IV) to 270°–280° C. gives the diimidazoline of the formula

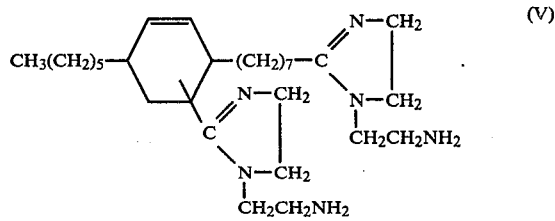

These products are, however, never obtained in high purity, since when a blend of two moles diethylene triamine and one mole $C_{21}$-dicarboxylic acid is heated slowly, some of the diethylene triamine distills with the water. Thus, upon prolonged heating, in addition to the products (III), (IV) and (V), polymers of the polyamide type are formed as byproducts. These byproducts can contain polyamidoamine structures and polyimidazoline structures as visualized by the formula:

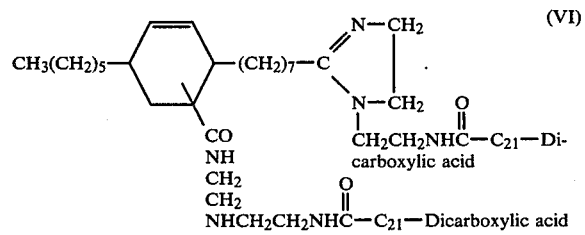

The formation of imidazolines is limited to polyethylene amines and polyamines characterized by at least one ethylene diamine functional group with at least three hydrogens attached to the two nitrogens. Compounds of this group which are able to give both amidoamines and imidazolines are: ethylene diamine, diethylene triamine, triethylene tetramine, tetraethylene pentamine, pentaethylene hexamine, and higher homologues; N-aminoethyl propane diamine, N,N-diaminoethyl propane diamine and the N-aminoethyl or N,N-diaminoethyl substituted butane diamines, pentane diamines and hexane diamines, and N-hydroxy ethyl ethylene diamine. These compounds have the general formulae $H_2NCH_2CH_2NHR$ (VII)
$R = H-, CH_3-, C_2H_5-, C_3H_7-,$
$\quad -CH_2CH_2OH, -(CH_2CH_2NH)_xH$
$x = 1, 2, 3, 4, \ldots 10$
or,
$R_1R_2N(CH_2)_yNHR_3$
$R_1 = H-, CH_3-, C_2H_5-, C_3H_7-,$
$\quad NH_2CH_2CH_2-,$
$R_2 = H-, CH_3-, C_2H_5-,$
$R_3 = H-, CH_3-, C_2H_5-, C_3H_7-,$
$\quad NH_2CH_2CH_2-,$
$y = 2, 3, 4, 5, 6.$ Amines capable of forming amidoamines but not imidazolines are: 1,3-diaminopropane, 1,4-diaminobutane 1,5-diaminopentane, 1,6-diaminohexane, piperazine (1,4-diazacyclohexane), N-aminoethylpiperazine, N-hydroxyethyl piperazine, N-aminopropyl-propane diamine-1,3, N-methyl-N-aminopropylpropane diamine-1,3, N,N-dimethylpropane diamine-1,3, N,N-diethyl propane diamine-1,3, N,N-dimethyl-ethylene diamine, N,N-diethyl ethylenediamine; N-aminohexylhexane diamine-1,6.

Certain amidoamines or imidazolines with tertiary nitrogens, such as the reaction product of $C_{21}$ dicarboxylic acid and N,N-dimethylpropane diamine-1,3 of the formula

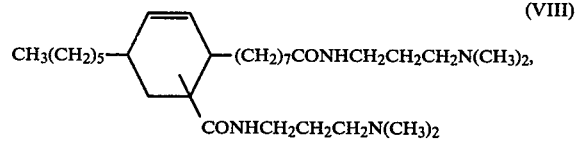

(VIII)

may be modified by further reaction with one or two moles of an alkylating agent such as methyl-, ethyl-, or benzyl halides, sulfates, phosphates, etc. The resulting compounds are classified as mono- or diquaternary ammonium salts. Their main characteristic is their solubility in aqueous systems without addition of acid, as is the case with amines, amidoamines, or imidazolines. An example of this type of quaternary ammonium salt as prepared by reacting one mole of the formula (VIII) compound with two moles of methyl sulfate to provide the following structure:

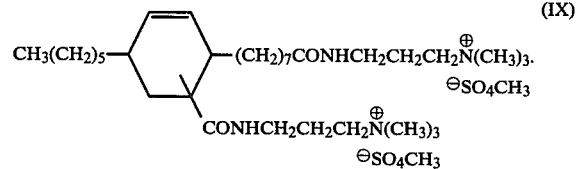

(IX)

Further modifications of the above described mono-, di-, or polymeric amidoamines or imidazolines are the reaction products with reactive oxirane systems such as ethylene oxide, propylene oxide or butylene oxide. Reaction occurs preferentially on primary and secondary nitrogens, that is, a nitrogen to which one or two hydrogen atoms are covalently bound. The reaction products belong to the class of N-hydroxyethyl, N-2-hydroxypropyl- and N-2-hydroxy butyl amidoamines or imidazolines. If excess oxirane is reacted, polyethylene ether, polypropylene ether or polybutylene ether derivatives are obtained.

A few of these $C_{21}$-dicarboxylic acid-polyamine reaction products, especially the diimidazolines are reported to be reactive resins and co-reactants with epoxy resins. Ethylene diamine, diethylene triamine, triethylene tetramine and tetra ethylene pentamine are specifically mentioned. Reaction products of $C_{19}$-dicarboxylic acid are disclosed in U.S. Pat. No. 2,966,478 to Harrison, and of $C_{21}$-dicarboxylic acid in British Pat. No. 1,046,208 to Crawford and U.S. Pat. No. 4,013,601 to Alford.

The examples which follow are illustrative of emulsifiers used to obtain cationic asphalt in water emulsions eminently useful for mixing under shear with a variety of siliceous and calcareous aggregates. After setting (evaporation of water), the asphalt films show excellent adhesion to the aggregate surface.

In preparing the bituminous emulsions of this invention, an aqueous acidic solution of the emulsifiers described below is intimately mixed under high shear in a colloid mill. The bitumen content can range from 30% to about 80% by weight, preferably between 60% and 70%. The dosage of the emulsifier can range from 0.1-10% by weight of the emulsion, preferably between 0.3-1.5% by weight of the emulsion. Dependent on the emulsifier, a mixing grade emulsion is obtained in a pH range of 2-7, with the optimum performance at a pH of about 4. In contrast to mixing grade emulsion prepared with tallow quaternary ammonium salts or tallow diquaternary diammonium salts, emulsifiers described in this invention exhibit high viscosity, thus allowing the preparation of suitable emulsions at a lower bitumen to water ratio.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted from solvents (cutback asphalts). Practically any viscosity or penetration graded asphalt cement for use in pavement construction as described in ASTM designation D-3381 and d-946 may be emulsified with the aid of the emulsifiers of this invention.

The cationic soap solutions are normally obtained by suspending the amidoamine or imidazoline in water to which a sufficient amount of a suitable acid, for instance, hydrochloric, sulfuric, and phosphoric acid or the like is added until the desired ph value below 7 is reached and a clear emulsifier solution is obtained. Thereafter, the soap solution which is preheated to about 55° C. and the fluid asphalt which is preheated to 120°–125° C. are mixed under high shear in a colloid mill for 30 seconds to give asphalt emulsions of brown color and creamy texture. Prior to testing according to ASTM D-244, the emulsions are stored at 70° C. for 16 hours. Aggregate mixing tests are performed by placing a weighed amount of aggregate in a mixing bowl, adding 5-10% by weight of the emulsion on top of the aggregate and mixing for one minute to five minutes. The mix is divided into three equal parts and placed in three dishes. The first sample is set aside; the second sample is washed with water immediately after mixing; and the third sample is washed with water after it was set aside for one hour. The percent coating of the aggregate surface is estimated visually. From the first sample, the percent initial coating, from the second sample, the percent initial washoff coating, and from the third sample, the percent one-hour washoff coating are obtained. The construction industry coating requirements are 95% minimum, 50% maximum and 50% minimum, respectively.

The emulsifiers of this invention perform very satisfactorily without auxiliary emulsifiers. However, occasionally it may be necessary to alter the performance of the emulsion to obtain improved viscosity at a given asphalt content or improved stability to dust and fines on the aggregate and to lengthen or shorten setting time, etc. In these cases, one of two methods can be employed. Either a mixture of tall oil fatty acids, preferably tall oil pitch, can be added to the bitumen (asphalt) prior to emulsification to improve break or improve the viscosity of the emulsion, or blends of the above described amidoamines and imidazolines with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. This class of compounds generally decreases setting time. Others are fatty monoquaternary ammonium salts and fatty diquaternary diammonium salts and nonionic emulsifiers, such as ethylene glycol polyethers of nonylor dodecyl phenol. Combinations of amidoamines and imidazolines, based on fatty monocarboxylic acids of various sources and the $C_{19}$- and $C_{21}$-dicarboxylic acids or $C_{22}$-tricarboxylic acid disclosed in this invention, can also be obtained by reacting suitable polyamines with a blend of fatty monocarboxylic and di- or tricarboxylic acids. Monocarboxylic acids suitable for this purpose are tall oil fatty acids, crude tall oil, rosin acids, rosin reacted with fumaric or maleic acid, tall oil pitch, tallow fatty acids, soya fatty acids and the like. Kraft lignin or Vinsol may also be co-reacted.

Dimer acids, which are long chain $C_{36}$-aliphatic carboxylic acids obtained by dimerization of fatty acids of various sources, may be also co-reacted. An example of this type of acid is produced by Emery Industries, Inc. under the trade name "Empol ® Dimer Acids".

Depending on the type of aggregate and its cleanliness, mixing is improved when aggregate is prewetted with 1–5% water by weight of the aggregate. The performance of the cationic asphalt emulsions in regard to mixing characteristics and setting (higher percentage of one-hour washoff coat) can, if necessary, also be improved when, based on the weight of asphalt, 1–15% of a solvent such as diesel oil is added to the asphalt prior to emulsification. The emulsions prepared with the di- and tricarboxylic acid-polyamine condensates disclosed in this invention are stable and can be stored for a long period of time until required for use. Depending on the intended application, the emulsion may be mixed with the aggregate at a central mixing plant in a large pug mill and the mix transported to the job site. Alternatively, the emulsion may be taken to the job site and mixed there, either with a mixing device, such as motorized mixing equipment, or manually.

The practice of this invention may be seen in the following examples wherein the preparation of various types of the emulsifiers of the invention is described and wherein the advantages of using these compounds in a medium setting mixing grade cationic bituminous emulsion are illustrated.

EXAMPLE 1

This example illustrates the variety of emulsifiers which can be obtained from the same starting materials at various temperatures and ratios of the reactants.

Emulsifier 1 (Diamidoamine type)

Two hundred grams $C_{21}$-dicarboxylic acid and 100 grams diethylene triamine were placed in a reaction vessel equipped with stirrer, reflux condenser and a Dean-Stark trap to collect distillate. The temperature was slowly raised to 230° C. After 28 mL of distillate was collected, the reaction was terminated.

Emulsifier 2 (Diimidazoline type)

The same amounts of starting materials were heated to 260°–270° C. After 40 mL of distillate was collected, the reaction was terminated.

Emulsifier 3 (Polymeric type)

Three hundred to four hundred grams $C_{21}$-dicarboxylic acid and 100 grams diethylene triamine were heated to 270° C. After 30–34 mL of distillate was collected, the reaction was terminated. After cooling to 160° C., ethylene glycol or diethylene glycol, in an amount of 75 grams, was added; and at 80° C., isopropanol was added in an amount of 70 grams to obtain a product which is fluid at ambient temperature.

EXAMPLE 2

This example illustrates the variety of emulsifiers which are obtained from the same dicarboxylic acid but various amines.

Emulsifier 4 (Diimidazoline type)

Two hundred-forty grams $C_{21}$-dicarboxylic acid and 100 grams ethylene diamine were blended at room temperature and diluted with 200 grams diethylene glycol. It was slowly heated to 250° C. After 52 mL of distillate was collected, the reaction was terminated.

Emulsifier 5 (Amidoamine type)

One hundred-fifty grams $C_{21}$-dicarboxylic acid and 100 grams aminoethyl piperazine were heated to 220° C. After 15 mL of distillate was collected, the reaction was terminated.

Emulsifier 6 (Quaternized amidoamine)

A blend of 120 grams $C_{21}$-dicarboxylic acid and 100 grams N,N-dimethyl aminopropylamine was diluted with 50 grams of xylene. The reaction mixture was heated slowly at to 240° C. The weight of the distillate was 85 grams. After cooling to 80° C., 185 grams of isopropanol was added to dilute to 50% activity. With external cooling to keep the temperature at 50°–60° C., 45 grams of dimethylsulfate was added slowly into the vigorously agitated diamidoamine solution.

Emulsifier 7 (Quaternized imidazoline)

Three hundred grams $C_{21}$-dicarboxylic acid and 200 grams N-aminoethyl ethanolamine were heated to 265° C. until 65 mL of distillate was collected. After cooling to 80° C., it was diluted with isopropanol to 50% activity. To the vigorously stirred and externally cooled solution of the diimidazoline 120 grams of dimethylsulfate was added.

Emulsifier 8 (Propoxylated imidazoline)

To 100 grams of 75% isopropanol solution of Emulsifier 2, 20 grams of propylene oxide was added and the blend transferred to a pressure bottle and heated for two hours at 70° C. and one hour at 100° C.

EXAMPLE 3

This example illustrates emulsifiers obtained from diethylene triamine and various dicarboxylic and tricarboxylic acids.

Emulsifier 9 ($C_{19}$-dicarboxylic acid-diamidoamine)

Fifty grams $C_{19}$-dicarboxylic acid and 25 grams diethylene triamine were heated to 240° C. After 8 mL of distillate was collected, the reaction was terminated.

Emulsifier 10 ($C_{22}$-tricarboxylic acid-amidoamine-imidazoline)

Fifty grams of $C_{22}$-tricarboxylic acid (obtained by Diels Alder addition of fumaric acid to $I_2$-isomerized tall oil fatty acids and purified by distillation to 85% tricarboxylic acid) and 50 grams diethylene triamine were heated to 260° C. After 24 mL of distillate was collected, the reaction was terminated.

Emulsifier 11 (fumarized resin acid—amidoamine)

One hundred-fifty grams fumarized resin acid (Rosin S fumarized with 9.75% fumaric acid) and 40 mL of isopropanol were heated until a clear melt was obtained. Then 75 grams of diethylene triamine was added and heated to 265° C. After 52 mL of distillate was collected, the reaction was terminated.

EXAMPLE 4

This example illustrates emulsifiers obtained from blends of $C_{21}$-dicarboxylic acid and conventional fatty acids, resin acids (Vinsol), or kraft lignin.

Emulsifier 12

One hundred twenty-five grams $C_{21}$-dicarboxylic acid and 125 grams Rosin S were heated to 80° C. to give a clear melt. One hundred grams of diethylene triamine was added and heated to 260° C. After 40 mL of distillate was collected, the reaction was terminated.

Emulsifier 13

One hundred-fifty grams $C_{21}$-dicarboxylic acid and 100 grams tall oil pitch were blended; and after 100 grams of diethylene triamine was added, the reaction mixture was heated to 265° C. After 39 mL of distillate was collected, the reaction was terminated.

Emulsifier 14

A blend of 150 grams $C_{21}$-dicarboxylic acid and 50 grams tall oil fatty acid (L-5) was heated with 100 grams diethyl triamine to 210° C. After 22 mL of distillate was collected, the reaction was terminated.

Emulsifier 15

A blend of 150 grams $C_{21}$-dicarboxylic acid and 50 grams tallow fatty acid was heated with 90 grams diethylene triamine to 220° C. After 26 mL of distillate was collected, the reaction was terminated.

Emulsifier 16

Seventy-five grams $C_{21}$-dicarboxylic acid and 25 grams $C_{36}$-dimer acid (Empol ® 1016) were blended at 50° C. To this blend 50 grams of diethylene triamine was added and heated to 250° C. After 25 mL of distillate was collected, the reaction was terminated, cooled and diluted with isopropanol.

Emulsifier 17

One hundred grams of diethylene triamine was heated to 80° C. and 50 grams of dry kraft lignin (which was isolated from kraft black liquor with sulfuric acid at pH 2.5) was added and heated to 150° C. for 30 minutes. The reaction mixture was cooled to 120° C. and 200 grams $C_{21}$-dicarboxylic acid added. The reaction mixture was heated to 260° C. After 45 mL of total distillate was collected, the reaction was terminated.

Emulsifier 18

Twenty-five grams Vinsol and 50 grams diethylene triamine were heated to 180° C. After 20 minutes, 75 grams of $C_{21}$-dicarboxylic acid was added and heated to 265° C. After 23 mL of distillate was collected, the reaction was terminated.

EXAMPLE 5

This example illustrates the properties of emulsions obtained when the above described emulsifiers were used for emulsification. To show the versatility of these emulsions, various siliceous and calcareous aggregates were used for the mixing experiments. Emulsions were prepared with Venezuelan asphalt, having a penetration value of 120-150. Excellent emulsions were obtained when 0.3-1.5% emulsifier dosage was used. Emulsions were prepared in the pH range from 2.5-6.5 with pH 4 being the optimum pH value. The pH adjustments were made with dilute hydrochloric acid. The test data are given in Table I. The aggregate test indicates whether an emulsion is suitable for mixing operations. It was carried out with mixing bowl and spoon. Depending on the cleanliness of the aggregate, it was prewetted with 1-3% water prior to addition of the emulsion. After a 5-9 grams emulsion (per 100 grams of aggregate) was mixed with aggregate for one-minute, initial coating, initial washoff coating, and one-hour washoff coating were determined visually. From these data, the mixing efficiency and set time with a specific aggregate can be determined.

TABLE I

EVALUATION OF ASPHALT EMULSIONS

| Emulsifier | % Dosage | pH Value | % Asphalt Content | Saybolt Furol Viscosity @ 50° C. (sec.) | % Initial Coating | % Initial Washoff Coating | % 1 Hour Washoff Coating | Aggregate |
|---|---|---|---|---|---|---|---|---|
| 1 | 0.8 | 2.5 | 68.9 | 212 | 100 | 10 | 95 | Schloss |
|  |  |  |  |  | 100 | 5 | 95 | Good Hope |
|  |  |  |  |  | 100 | 0 | 85 | Rhyolite |
| 2 | 0.8 | 2.5 | 68.3 | 123 | 100 | 20 | 80 | Riffe |
|  |  |  |  |  | 100 | 5 | 90 | Schloss |
|  |  |  |  |  | 100 | 0 | 85 | Rhyolite |
|  |  |  |  |  | 100 | 10 | 100 | Good Hope |
|  |  |  |  |  | 100 | 5 | 70 | Licking Limestone |
| 3 | 1.0 | 2.5 | 69.9 | 150 | 85 | 30 | 85 | Tennessee River Gravel |
|  |  |  |  |  | 100 | 0 | 95 | Tennessee Limestone |
|  |  |  |  |  | 100 | 0 | 100 | Rhyolite |
|  |  |  |  |  | 100 | 0 | 100 | Riffe |
| 4 | 0.8 | 4.0 | 68.1 | 53 | 100 | 0 | 100 | Schloss |
|  |  |  |  |  | 100 | 5 | 75 | Rhyolite |
|  |  |  |  |  | 100 | 0 | 100 | Tennessee Limestone |
| 5 | 0.8 | 4.5 | 68.2 | 82 | 100 | 30 | 100 | Big Sandy |
| 6 | 0.8 | 2.5 | 65.5 | 55 | 100 | 30 | 90 | Schloss |
| 7 | 0.8 | 2.5 | 68.0 | 72 | 100 | 10 | 100 | Schloss |
| 8 | 1.0 | 4.0 | 67.6 | 51 | 100 | 0 | 100 | Schloss |

TABLE I-continued

EVALUATION OF ASPHALT EMULSIONS

| Emulsifier | % Dosage | pH Value | % Asphalt Content | Saybolt Furol Viscosity @ 50° C. (sec.) | % Initial Coating | % Initial Washoff Coating | % 1 Hour Washoff Coating | Aggregate |
|---|---|---|---|---|---|---|---|---|
| | | | | | 100 | 0 | 50 | Tennessee Limestone |
| 9 | 0.8 | 4.5 | 68.0 | 104 | 100 | 10 | 80 | Schloss |
| 10 | 0.8 | 4.5 | 66.7 | 43 | 100 | 5 | 100 | Schloss |
| | | | | | 100 | 0 | 70 | Tennessee Limestone |
| | | | | | 95 | 5 | 95 | Tennessee River Gravel |
| 11 | 0.8 | 4.5 | 68.0 | 188 | 100 | 95 | 100 | Schloss |
| | | | | | 100 | 30 | 100 | Tennessee Limestone |
| | | | | | 100 | 10 | 100 | Rhyolite |
| 12 | 0.8 | 2.5 | 68.9 | 203 | 100 | 45 | 100 | Schloss |
| | | | | | 100 | 0 | 95 | Rhyolite |
| 13 | 0.8 | 2.5 | 68.9 | 114 | 100 | 5 | 80 | Schloss |
| 14 | 0.8 | 4.5 | 68.6 | 124 | 100 | 5 | 95 | Schloss |
| | | | | | 100 | 10 | 90 | Rhyolite |
| | | | | | 100 | 20 | 100 | Tennessee River Gravel |
| | | | | | 100 | 5 | 95 | Tennessee Limestone |
| 15 | 0.8 | 4.5 | 67.3 | 23 | 100 | 10 | 90 | Schloss |
| 16 | 0.8 | 4.0 | 68.1 | 53 | 100 | 5 | 100 | Schloss |
| 17 | 0.8 | 4.5 | 68.0 | 113 | 100 | 10 | 80 | Schloss |
| | | | | | 100 | 20 | 80 | Riffe |
| | | | | | 100 | 10 | 100 | Tennessee River Gravel |
| | | | | | 100 | 5 | 100 | Tennessee Limestone |
| | | | | | 100 | 10 | 100 | Rhyolite |
| 18 | 0.7 | 4.5 | 69.4 | 270 | 100 | 5 | 40 | Schloss |
| | | | | | 100 | 5 | 50 | Rhyolite |
| | | | | | 100 | 5 | 70 | Tennessee River Gravel |
| | | | | | 100 | 5 | 50 | Tennessee Limestone |

For all emulsifiers tested, excellent coating characteristics were observed for all aggregate types.

EXAMPLE 6

This example shows the properties of emulsions obtained with blends of Emulsifier 2 and auxiliary emulsifiers. The emulsions were prepared as described under Example 5. Mixing time was one minute. Distinct differences in percent washoff coat after various times can be seen depending on aggregate and auxiliary emulsifier. The results, presented in Table II below, show the ability to control the rate of set by one's choice of auxiliary emulsifiers.

TABLE II

EVALUATION OF EMULSIFIER BLENDS

| Emulsifier | % Dosage | % Asphalt Content | pH Value | Saybolt Furol Viscosity @ 50° C. (sec.) | Aggregate | % Initial Coat | % Initial Washoff Coat | % 15 min. Washoff Coat | % 30 min. Washoff Coat | % 60 min. Washoff Coat |
|---|---|---|---|---|---|---|---|---|---|---|
| Emulsifier 2 | 75% | 0.8 | 67.6 | 4.5 | 27 | Schloss | 100 | 80 | 95 | 100 | |
| Tallow Diamine (Arosurf AA-23) | 25% | | | | | Tennessee Limestone | 100 | 10 | 95 | 100 | |
| | | | | | | Rhyolite | 100 | 10 | 80 | 100 | |
| Emulsifier 2 | 75% | 0.8 | 67.4 | 4.5 | 50 | Schloss | 100 | 5 | | 70 | 95 |
| NP-40 (nonyl-phenol ethoxylate) | 25% | | | | | Tennessee Limestone | 100 | 5 | 50 | 80 | |
| | | | | | | Rhyolite | 100 | 5 | 70 | 95 | |
| Emulsifier 2 | 75% | 0.8 | 68.3 | 4.5 | 76 | Schloss | 100 | 5 | | 95 | 100 |
| Tallow Ammonium Chloride | 25% | | | | | Tennessee Limestone | 100 | 5 | 50 | 80 | |
| | | | | | | Rhyolite | 100 | 5 | 80 | 95 | |
| Emulsifier 2 | 75% | 0.8 | 68.4 | 4.5 | 77 | Schloss | 100 | 5 | | 70 | 95 |
| Tallow Diammonium Dichloride | 25% | | | | | Tennessee Limestone | 100 | 5 | 50 | 80 | |
| | | | | | | Rhyolite | 100 | 10 | 85 | 100 | |
| Emulsifier 2 | 70% | 1.0 | 68.4 | 4.0 | 75 | Schloss | 100 | 5 | | 90 | 100 |
| Dodecanol | 30% | | | | | Tennessee Limestone | 100 | 0 | | 80 | 95 |

EXAMPLE 7

This example shows the dependence of percent washoff coat on mixing time and the amount of water used to prewet the aggregate. Other parameters influencing the percent washoff coat (setting time) are the pH value of the emulsion, the temperature of the environment, etc. Asphalt emulsions were prepared with Emulsifier 2, as described in Example 5. The results are listed in Table III.

TABLE III
DEPENDENCE OF SET TIME ON MIXING TIME

| Aggregate | Mixing Time (min.) | % Initial Coat | % Initial Washoff Coat | % 15 min. Washoff Coat | % 30 min. Washoff Coat | % Water |
|---|---|---|---|---|---|---|
| Schloss | 1 | 100 | 2 | 50 | 100 | 3 |
| | 2 | 100 | 10 | 80 | 100 | 3 |
| | 3 | 100 | 50 | 100 | 100 | 3 |
| | 3 | 100 | 10 | 100 | 100 | 4 |
| | 5 | 100 | 10 | 100 | 100 | 4 |
| Rhyolite | 1 | 100 | 2 | 40 | 85 | 1 |
| | 3 | 100 | 5 | 80 | 100 | 1 |
| Tennessee | 1 | 100 | 2 | 30 | 95 | 2 |
| Limestone | 3 | 100 | 2 | 90 | 100 | 2 |
| Tennessee River Gravel | 1 | 100 | 20 | 70 | 100 | 2 |
| | 3 | 100 | 25 | 100 | 100 | 2 |

Therefore, the percent washoff coat is dependent upon mixing time and the amount of water used to prewet the aggregate.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A cationic bituminous emulsion comprising from about 30% to about 80% by weight of bitumen, from about 0.1% to about 10% by weight of an emulsifier selected from the group consisting of reaction products of polyamines reacted with the polycarboxylic acids corresponding to the formulae

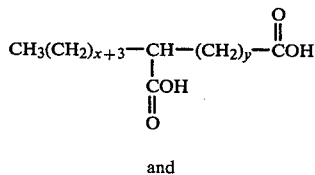

and

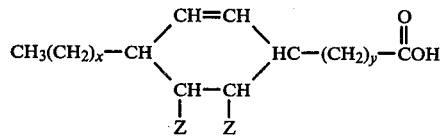

wherein x and y are integers from 3 to 9, x and y together equal 12, at least one Z is carboxylic acid group and any remaining Z is hydrogen, and water to make up 100% by weight, the emulsion having a pH in the range of from 2-7.

2. The cationic bituminous emulsion of claim 1 wherein the emulsion is a mixing grade composition.

3. The cationic bituminous emulsion of claim 1 including up to 90% of the total emulsifier formulation of one or more auxiliary emulsifiers selected from the group consisting of fatty amines, fatty propane diamines, fatty amidoamines, fatty imidazolines, fatty monoquaternary ammonium salts, fatty diquaternary diammonium salts, and ethylene glycol polyethers of nonyl or dodecyl phenol.

4. The cationic bituminous emulsion of claim 1 including up to 90% of the total emulsifier formulation of one or more auxiliary emulsifiers selected from the group consisting of nitrogen derivatives of resin acids and nitrogen derivatives of kraft lignin.

5. The cationic bituminous emulsion of claim 1 wherein the emulsifier formulation is prepared by reacting a polyamine with a blend of fatty monocarboxylic acids and a polycarboxylic acid of claim 1.

6. The cationic bituminous emulsion wherein the emulsifier formulation is prepared by reacting a polyamine with a blend of resin acids and a polycarboxylic acid of claim 1.

7. The cationic bituminous emulsion wherein the emulsifier formulation is prepared by reacting a polyamine with a blend of kraft lignin and a polycarboxylic acid of claim 1.

8. The cationic bituminous emulsion of claims 1, 2, 3, 4, 5, 6 or 7 comprising from about 60% to 70% bitumen by weight of the emulsion, from about 0.3% to 1.5% emulsifier by weight of the emulsion, and water to make up 100% by weight, the emulsion having a pH of about 4.

9. The cationic bituminous emulsion of claim 1 or 2 wherein the emulsion includes from 1% to 15% by volume of a hydrocarbon oil.

10. The cationic bituminous emulsion of claim 1 wherein a mixture of tall oil fatty acids is added to the bitumen prior to emulsification.

11. The cationic bituminous emulsion of claim 10 wherein the tall oil fatty acids mixture is tall oil pitch.

* * * * *